United States Patent
Dickman et al.

(10) Patent No.: US 10,023,304 B2
(45) Date of Patent: Jul. 17, 2018

(54) TAIL ROTOR ACTUATION SYSTEM

(71) Applicant: Bell Helicopter Textron Inc., Fort Worth, TX (US)

(72) Inventors: Corey Dickman, Tyrone, PA (US); Carlos A. Fenny, Arlington, TX (US); David Schultz, Grand Prairie, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 88 days.

(21) Appl. No.: 14/286,197

(22) Filed: May 23, 2014

(65) Prior Publication Data
US 2016/0200430 A1 Jul. 14, 2016

(51) Int. Cl.
*B64C 27/12* (2006.01)
*B64C 13/50* (2006.01)
*B64C 27/82* (2006.01)
*B64C 27/14* (2006.01)

(52) U.S. Cl.
CPC ............ *B64C 13/503* (2013.01); *B64C 27/14* (2013.01); *B64C 27/82* (2013.01)

(58) Field of Classification Search
CPC ....... B64C 27/82; B64C 27/52; B64C 27/605; B64C 27/58; B64C 27/59; B64C 27/78; B64C 27/72; B64C 27/12; B64C 13/503; F01D 7/00; F15B 18/00
USPC ...................................................... 244/17.19
See application file for complete search history.

(56) References Cited

U.S. PATENT DOCUMENTS

| | | | | |
|---|---|---|---|---|
| 3,199,601 A | * | 8/1965 | Dean | B64C 27/32 244/17.21 |
| 3,411,410 A | * | 11/1968 | Westbury et al. | 91/1 |
| 4,340,335 A | * | 7/1982 | Cheney | B64C 27/82 416/138 |
| 4,516,476 A | * | 5/1985 | Beaton | B23Q 1/0009 901/50 |
| 4,699,043 A | * | 10/1987 | Violante De Dionigi | 91/182 |
| 5,607,122 A | * | 3/1997 | Hicks | B64C 27/78 244/17.13 |
| 8,657,229 B2 | * | 2/2014 | Schank | B64C 27/615 244/213 |
| 2004/0075019 A1 | * | 4/2004 | Collins | B64C 13/30 244/99.9 |
| 2008/0145221 A1 | * | 6/2008 | Sun | B64C 27/615 416/23 |

* cited by examiner

*Primary Examiner* — Medhat Badawi
*Assistant Examiner* — Vicente Rodriguez

(57) ABSTRACT

In some embodiments, an actuation system includes a an actuator assembly, a yoke, and a control rod. The actuator assembly comprises a first actuator. The first actuator is configured to extend in a first direction and retract in a second direction opposite of the first direction. The yoke is coupled to the first actuator at a first actuator end proximate to the first direction. The control rod is coupled to the yoke at a first control rod end and extends in the second direction past the actuator assembly to a second end in mechanical communication with an output device.

16 Claims, 3 Drawing Sheets

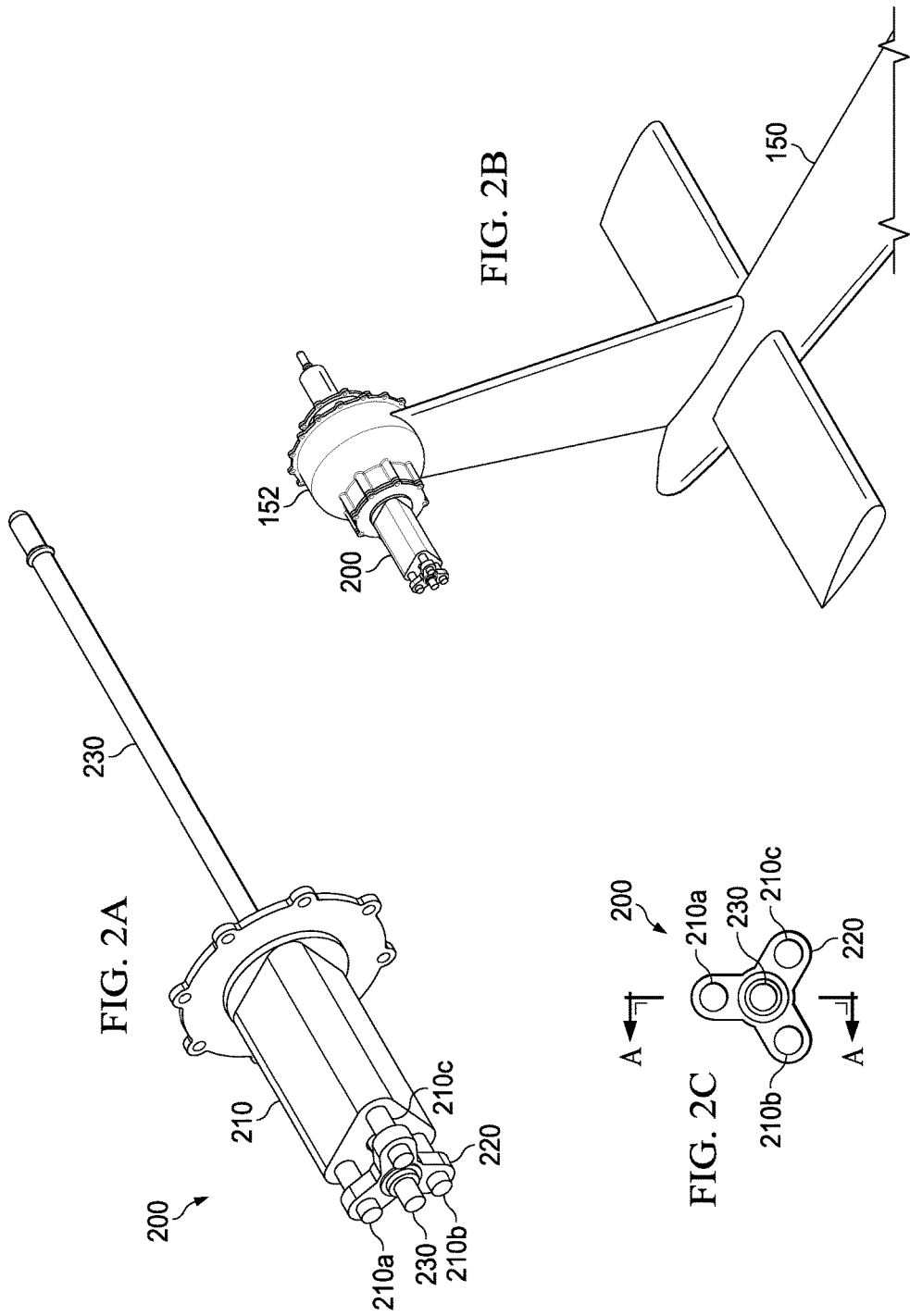

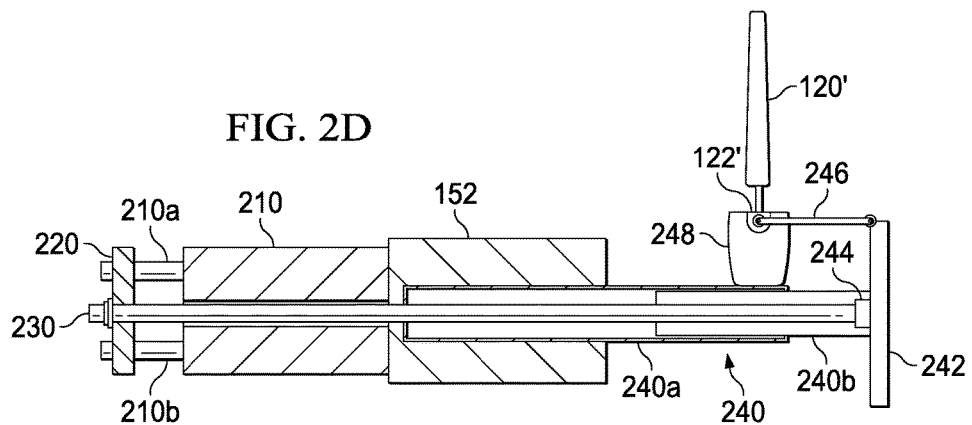
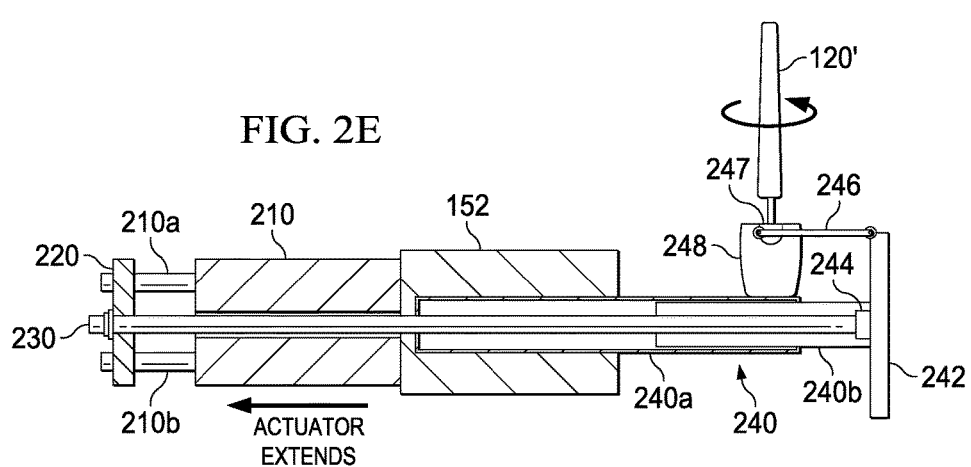
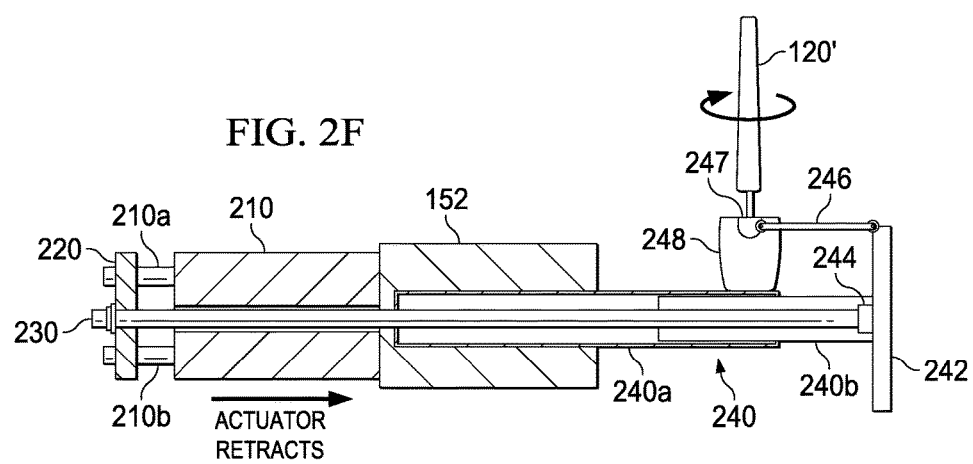

TAIL ROTOR ACTUATION SYSTEM

TECHNICAL FIELD

This invention relates generally to actuation systems, and more particularly, to a tail rotor actuation system.

BACKGROUND

A rotorcraft may include one or more rotor systems. One example of a rotorcraft rotor system is a main rotor system. A main rotor system may generate aerodynamic lift to support the weight of the rotorcraft in flight and thrust to counteract aerodynamic drag and move the rotorcraft in forward flight. Another example of a rotorcraft rotor system is a tail rotor system. A tail rotor system may generate thrust in the same direction as the main rotor system's rotation to counter the torque effect created by the main rotor system.

SUMMARY

Particular embodiments of the present disclosure may provide one or more technical advantages. A technical advantage of one embodiment may include the capability to improve packaging of a tail rotor actuation system. A technical advantage of one embodiment may include the capability to add redundancy to a tail rotor actuation system, especially in a fly-by-wire control system.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which:

FIGS. 2A-2F show a tail rotor actuation system according to one example embodiment that may be installed on the rotorcraft of FIG. 1.

DETAILED DESCRIPTION OF THE DRAWINGS

Figure 1:
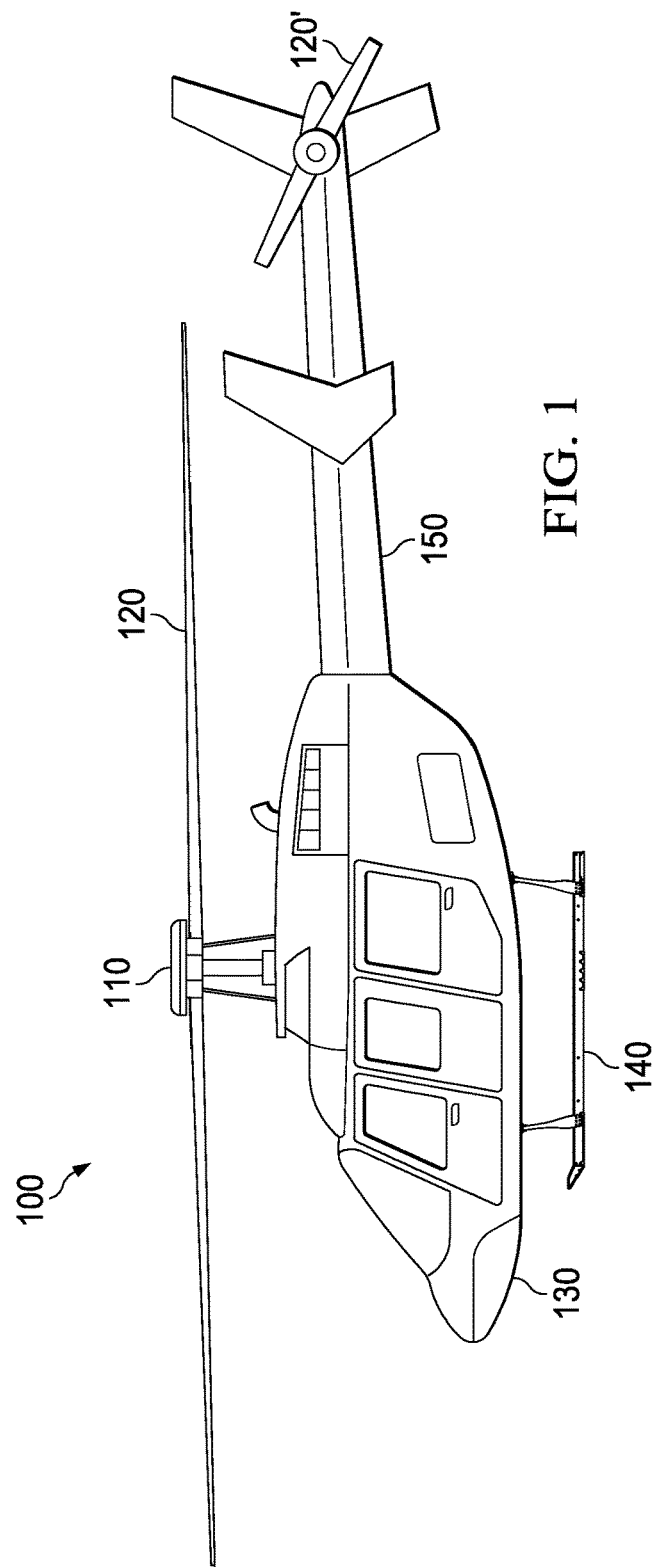
FIG. 1 shows a rotorcraft according to one example embodiment.

FIG. 1 shows a rotorcraft 100 according to one example embodiment. Rotorcraft 100 features a rotor system 110, blades 120, a fuselage 130, a landing gear 140, and an empennage 150. Rotor system 110 may rotate blades 120. Rotor system 110 may include a control system for selectively controlling the pitch of each blade 120 in order to selectively control direction, thrust, and lift of rotorcraft 100. In some embodiments, the control system may include a swashplate; moving the swashplate may change the pitch of one or more blades 120 and cause the aircraft to change direction.

Fuselage 130 represents the body of rotorcraft 100 and may be coupled to rotor system 110 such that rotor system 110 and blades 120 may move fuselage 130 through the air. Landing gear 140 supports rotorcraft 100 when rotorcraft 100 is landing and/or when rotorcraft 100 is at rest on the ground. Empennage 150 represents the tail section of the aircraft and features components of a rotor system 110 and blades 120'. Blades 120' may provide thrust in the same direction as the rotation of blades 120 so as to counter the torque effect created by rotor system 110 and blades 120. Teachings of certain embodiments relating to rotor systems described herein may apply to rotor system 110 and/or other rotor systems, such as other tilt rotor and helicopter rotor systems. It should also be appreciated that teachings regarding rotorcraft 100 may apply to aircraft and vehicles other than rotorcraft, such as airplanes and unmanned aircraft, to name a few examples.

As stated above, a control system may selectively control the pitch of each blade 120 and/or 120' in order to selectively control direction, thrust, and lift of rotorcraft 100. In some embodiments, a control system may receive inputs (e.g., from a pilot, flight computer, and/or other flight control equipment) and change the pitch of each blade 120 and/or 120' based on these inputs by, for example, changing the swashplate position. Example embodiments of a control system for selectively controlling the pitch of blades 120 and/or 120' may include equipment from mechanical, fly-by-wire, and/or other flight control systems.

Different control systems may offer different benefits. For example, some control systems may include redundant components to improve safety and operation in the event of a failure. As another example, some control systems may have smaller packaging sizes or include components that can be moved to more convenient areas of rotorcraft 100. As yet another example, some control system components may work with fly-by-wire flight control systems, which may offer lower weight and greater controllability as compared to mechanical flight control systems.

Teachings of certain embodiments recognize the capability to provide some or all of these benefits. For example, FIGS. 2A-2F show a tail rotor actuation system 200 according to one example embodiment. FIG. 2A shows a perspective view of tail rotor actuation system 200, FIG. 2B shows a perspective view of tail rotor actuation system 200 installed on empennage 150 of rotorcraft 100 (with blades 120' removed), FIG. 2C shows an end view of tail rotor actuation system 200, FIG. 2D shows a cross-section view of the tail rotor actuation system 200 of FIG. 2C, FIG. 2E shows the cross-section view of FIG. 2D when tail rotor actuation system 200 is extended, and FIG. 2F shows the cross-section view of FIG. 2D when tail rotor actuation system 200 is retracted.

As seen in the example of FIG. 2A, tail rotor actuation system 200 may include an actuator assembly 210, a yoke 220, and a control rod 230. Tail rotor actuation system 200 may be controlled by a variety of flight control systems, such as mechanical, fly-by-wire, and/or other flight control systems. In one example embodiment, tail rotor actuation system 200 may be controlled in a fly-by-wire flight control configuration. For example, flight control inputs from a pilot may be converted to actuation inputs to actuator assembly 210 in order to cause selective actuation of yoke 220 and control rod 230. In an alternative embodiment, an unmanned flight control system is used in lieu of the pilot.

In the example of FIG. 2A, actuator assembly 210 features three actuators 210a, 210b, and 210c. In this example embodiment, actuator assembly 210 may also be referred to as a triplex actuator because it includes three piston/cylinder pairs. Each actuator is coupled to yoke 220 and configured to extend and retract yoke 220, which causes yoke 220 to translate control rod 230. Teachings of certain embodiments recognize that providing a triplex actuator may improve performance in the event of an actuator failure. For example, the failure of a single piston/cylinder assembly only results in a one-third loss of power in the triplex actuator. As another example, each piston/cylinder assembly within an individual triplex actuator may be separately powered by a hydraulic power pack (discussed below), thus further realizing an increased level of safety.

In some embodiments, actuator assembly 210 may include a manifold associated with each actuator 210a-210c. Each manifold may be in hydraulic communication with a hydraulic power pack to provide hydraulic fluid to the actuators. Each hydraulic power pack may include a pump and a reservoir in one package. One or more flight control computers (FCCs) may control each manifold and/or hydraulic power pack.

In some embodiments, each manifold may include an integrated three function valve (ITFV) configured to allow actuator assembly 210 a to operate even after a failure of one or two of actuators 210a-210c. For example, ITFV may be used to quickly inert a malfunctioning actuator so that the remaining healthy actuators can continue to operate without fighting the malfunctioning actuator. Further, ITFV may allow a single actuator to be in bypass while allowing actuator assembly 210 to be supplied energy via other hydraulic power packs. Each manifold may also include an electro-hydraulic servo-valve (EHSV). An ITFV and EHSV are disclosed in U.S. Pat. No. 7,003,949, titled "Integrated Three Function Valve," issued 28 Feb. 2006, to Fenny, et al. (Fenny '949). Fenny '949 is incorporated herein by reference.

As seen in the example of FIGS. 2D-2F, control rod 230 may be coupled to yoke 220 at one end and coupled via a roller bearing 244 to a cross-head 242 at an opposite end such that the ends of control rod 230 are on opposite sides of empennage 150. In this example, control rod 230 passes through an opening in actuator assembly 210, through an opening in gearbox 152 (coupled to empennage 150 in FIG. 2B), and through a mast assembly 240. Teachings of certain embodiments recognize that passing control rod 230 through some or all of these components may achieve packaging benefits. For example, providing actuator assembly 210 on one side of gearbox 152 and providing blades 120' and the opposite side of gearbox 152 may reduce the distance between blades 120' and gearbox 152.

During operation, according to one example embodiment, gearbox 152 provides rotational energy to a rotating mast portion 240a of mast 240. Mast portion 240a transfers at least some of this rotational energy to hub 248, which causes each blade 120' to rotate. In the example of FIGS. 2D-2F, each blade 120' is coupled to hub 248 via a CF bearing 122'.

Also during operation, according to this example embodiment, actuator assembly 210 extends and retracts yoke 220, which causes control rod 230 to translate linearly. Linear translation of control rod 230 causes extension and retraction of cross-head 242, which is coupled to control rod 230 via roller bearing 244. In the example of FIGS. 2D-2F, mast 240 also includes a mast portion 240b that rotates with mast portion 240a and translates with control rod 230. In this example, mast portion 240b is coupled to cross-head 242 and causes cross-head 242 to rotate with hub 248.

A pitch link 246 couples cross-head 242 to hub 248 and/or blade 120'. In some embodiments, a pitch link 246 may be provided for each blade 120', although teachings of certain embodiments recognize that more or fewer pitch links may be used. In operation, extension of retraction of cross-head 242 may cause pitch link 246 to change the deflection angle of blade 120'. FIG. 2E shows an example of how actuator extension changes the deflection angle of blade 120', and FIG. 2F shows an example of how actuator retraction changes the deflection angle of blade 120'.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

Although several embodiments have been illustrated and described in detail, it will be recognized that substitutions and alterations are possible without departing from the spirit and scope of the present invention, as defined by the appended claims.

To aid the Patent Office, and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are explicitly used in the particular claim.

What is claimed is:

1. A rotorcraft, comprising:
   a body including an empennage;
   a power train coupled to the body and comprising an engine and a drive shaft coupled to the engine;
   a rotor system coupled to the power train, the rotor system comprising at least one tail rotor blade and a tail rotor gearbox in mechanical communication with the at least one tail rotor blade and coupled to the empennage; and
   an actuation system in mechanical communication with the rotor system, the actuation system comprising:
      an actuator assembly comprising a first actuator, the first actuator having a first end, a second end, and a body portion disposed between the first end and the second end, the first actuator configured to extend in a first direction and retract in a second direction opposite of the first direction;
      a yoke coupled to the first end of the first actuator such that the body portion of the first actuator is oriented away from the yoke, and such that the yoke translates as the first actuator extends in the first direction and retracts in the second direction;
      a control rod having a first end, a second end, and a body portion disposed between the first end and the second end, the first end of the control rod coupled to the yoke such that the body portion of the control rod is oriented away from the yoke in the same direction as the body portion of the first actuator,
      wherein the control rod extends through an opening in the tail rotor gearbox such that the first and second control rod ends extend through opposite sides of the empennage, and
      wherein when the first actuator extends in the first direction and retracts in the second direction, a pitch angle of the at least one rotor blade is changed.

2. The rotorcraft of claim 1, wherein the actuator assembly and the at least one tail rotor blade are located on opposite sides of the empennage.

3. The rotorcraft of claim 1, the rotor system further comprising:
   a cross-head coupled to the second end of the control rod; and
   a pitch link coupled to the cross-head and in mechanical communication with the at least one tail rotor blade.

4. The rotorcraft of claim 3, the cross-head and pitch link operable to change the pitch angle of the at least one tail rotor blade in response to movement of the control rod in the first direction or in the second direction.

5. The rotorcraft of claim 1, the rotor system further comprising a tail rotor mast, the tail rotor mast comprising:
   a first portion configured to transfer rotational energy from the tail rotor gearbox to the at least one tail rotor blade; and
   a second portion configured to rotate in response to rotation of the cross-head and translate in response to translations of the control rod.

6. The rotorcraft of claim 1, further comprising a tail rotor control system operable to change a position of the first actuator in response to a request to change the pitch angle of the at least one tail rotor blade.

7. The rotorcraft of claim 1, wherein the actuator assembly comprises a second actuator and a third actuator, the second actuator and the third actuator coupled to the yoke and configured to extend in the first direction and retract in the second direction opposite of the first direction.

8. A method of actuating a rotor system of a rotorcraft, comprising:
   receiving an input; and
   changing an actuator output position of an actuator assembly in response to the received input, wherein:
   the rotor system comprises at least one tail rotor blade and a tail rotor gearbox coupled to an empennage and in mechanical communication with the at least one tail rotor blade;
   the actuator assembly comprises a first actuator, the first actuator having a first end, a second end, and a body portion disposed between the first end and the second end, the first actuator configured to extend in a first direction and retract in a second direction opposite of the first direction;
   a yoke is coupled to the first end of the first actuator such that the body portion of the first actuator is oriented away from the yoke;
   a control rod has a first end, a second end, and a body portion disposed between the first end and the second end, the first end of the control rod is coupled to the yoke such that the body portion of the control rod is oriented away from the yoke in the same direction as the body portion of the first actuator; and
   the second end of the control rod is in mechanical communication with the rotor system such that when the first actuator extends in the first direction and retracts in the second direction, a pitch angle of the at least one rotor blade is changed,
   wherein the control rod extends through an opening in the tail rotor gearbox such that the first and second control rod ends extend through opposite sides of the empennage.

9. The method of claim 8, wherein the actuator assembly and the at least one tail rotor blade are located on opposite sides of the empennage.

10. The method of claim 8, wherein the actuator assembly comprises a second actuator and a third actuator, the second actuator and the third actuator coupled to the yoke and configured to extend in the first direction and retract in the second direction opposite of the first direction.

11. The rotorcraft of claim 1, wherein the body portion of the first actuator is substantially adjacent to and substantially parallel to the body portion of the control rod.

12. The method of claim 8, wherein the body portion of the first actuator is substantially adjacent to and substantially parallel to the body portion of the control rod.

13. The rotorcraft of claim 1, wherein the control rod translates as the first actuator extends in the first direction and retracts in the second direction.

14. The method of claim 8, wherein the control rod translates as the first actuator extends in the first direction and retracts in the second direction.

15. The rotorcraft of claim 1, wherein the body portion of the control rod is disposed at least partially within the actuator assembly.

16. The method of claim 8, wherein the body portion of the control rod is disposed at least partially within the actuator assembly.

* * * * *